United States Patent [19]

Natarajan

[11] Patent Number: 5,239,673
[45] Date of Patent: Aug. 24, 1993

[54] SCHEDULING METHODS FOR EFFICIENT FREQUENCY REUSE IN A MULTI-CELL WIRELESS NETWORK SERVED BY A WIRED LOCAL AREA NETWORK

[75] Inventor: Kadathur S. Natarajan, Millwood, N.Y.

[73] Assignee: International Business Machines Corporation, N.Y.

[21] Appl. No.: 605,291

[22] Filed: Oct. 29, 1990

[51] Int. Cl.$^5$ .............................................. H04Q 7/00
[52] U.S. Cl. .................... 455/33.1; 455/33.4; 455/56.1; 455/66; 370/85.5
[58] Field of Search ............ 455/33.1, 33.2, 33.4, 455/34.1, 34.2, 54.1, 54.2, 58.1, 66, 56.1; 370/85.5, 95.3; 340/825.05

[56] References Cited

U.S. PATENT DOCUMENTS

| | | | |
|---|---|---|---|
| 4,144,496 | 3/1979 | Cunningham et al. | 379/60 |
| 4,402,090 | 8/1983 | Gfeller et al. | 359/172 |
| 4,456,793 | 6/1984 | Baker et al. | 379/56 |
| 4,549,291 | 10/1985 | Renoulin et al. | 370/85.5 |
| 4,597,105 | 6/1986 | Freeburg | 455/33.4 |
| 4,639,914 | 1/1987 | Winters | 370/110.1 |
| 4,665,519 | 5/1987 | Kirchner et al. | 370/94.1 |
| 4,730,310 | 3/1988 | Acampora et al. | 370/95.1 |
| 4,777,633 | 10/1988 | Fletcher et al. | 370/50 |
| 4,792,946 | 12/1988 | Mayo | 370/14 |
| 4,807,222 | 2/1989 | Amitay | 359/136 |
| 4,819,229 | 4/1989 | Pritty et al. | 370/85.5 |
| 4,837,858 | 6/1989 | Ablay et al. | 455/34.1 |
| 4,852,122 | 7/1989 | Nelson et al. | 375/8 |
| 4,881,271 | 11/1989 | Yamauchi et al. | 455/56.1 |
| 4,926,495 | 5/1990 | Comroe et al. | 455/54.2 |
| 5,029,183 | 7/1991 | Tymes | 375/1 |

FOREIGN PATENT DOCUMENTS 2174272A 10/1986 United Kingdom .

OTHER PUBLICATIONS

The Cellnet Cellular Radio Network, M. S. Appleby and J. Garrett, British Telecommunications Engineering, vol. 4, Jul. 1985, pp. 62-69.

IBM Technical Disclosure Bulletin, vol. 24, No. 7, Jan. 1982 entitled "Infrared Microbroadcasting Network for In-House Data Communication" by F. Gfeller.

IBM Technical Disclosure Bulletin, vol. 20, No. 7, Dec. 1977, entitled "Wireless Connection Between a Controller and a Plurality of Terminals" by F. Closs et al.

"Some Experiments with Simulated Annealing for Coloring Graphs" by M. Chams et al. European Jrnl. of Operational Research 32 (1987) 260-266.

"New Methods of Color the Vertices of a Graph" by D. Brelaz, Communications of the ACM Apr. 1979, vol. 22, No 4.

"A Graph Coloring Algorithm for Large Scheduling Problems" by F. Leighton, Jrnl. of Research of the National Bureau of Standards, vol. 84, No. 6, Nov.–Dec. 1979.

*Primary Examiner*—Reinhard J. Eisenzopf
*Assistant Examiner*—Andrew Faile
*Attorney, Agent, or Firm*—Perman & Green

[57] ABSTRACT

A method includes a first step of receiving a message from a wired network (1) with at least one header station (12). The message is a message type that authorizes a header station or header stations to transmit on a wireless network. A second step of the method is accomplished in response to the received first message, and initiates wireless communications with any mobile communication units (10) that are located within a communication cell served by the at least one header station. In one embodiment the message circulates around a token ring and activates header stations in turn. In another embodiment disjoint groups of header stations are predetermined by graphical techniques, including graph coloring methods. The predetermined group information is maintained by a network controller that thereafter selectively activates the header stations within the different groups.

24 Claims, 4 Drawing Sheets

SCHEDULING METHODS FOR EFFICIENT FREQUENCY REUSE IN A MULTI-CELL WIRELESS NETWORK SERVED BY A WIRED LOCAL AREA NETWORK

FIELD OF THE INVENTION

This invention relates generally to communication methods and, in particular, to scheduling methods for providing frequency reuse in a multi-cell wireless network.

BACKGROUND OF THE INVENTION

In a local area network (LAN) a user, such as a portable computer equipped with communication capability, gains access to the LAN via a physical connection in order to communicate with remote facilities or use shared resources, such as file servers, print servers, etc. In a stationary mode of operation, all users are static and each user gains access to the network via a fixed homing point. However, in a mobile environment users are free to change their physical location and cannot be restricted to gain access to the network only through one of several homing points attached to the LAN. In a mobile environment the homing points are fixed header stations that communicate with the mobile users through a wireless link. Examples of wireless links include radio frequency (RF) links, microwave links and infrared (IR) links.

Of interest herein are wireless communication networks having overlapping coverage areas or cells wherein the same frequencies are employed for the uplink and the downlink, respectively, within each area. The use of the same frequencies in overlapping communication cells is referred to as frequency reuse. Frequency reuse is advantageous in that it eliminates a requirement that the mobile users switch frequencies when migrating from one cell to another.

However, the transmission and reception of messages in a cell of a multicell network, of the type that employs identical communication frequencies in different cells, requires control of interference between users. This interference may occur from several sources including uplink transmissions from mobile users that lie in overlapping areas between adjacent cells and downlink transmissions from header stations if their overlapping cell areas contain one or more mobile users.

The following U.S. Patents and articles are made of record for teaching various aspects of mobile communication.

The following two U.S. Patents show communication systems having overlapping coverage areas. U.S. Pat. No. 4,597,105, Jun. 24, 1986, entitled "Data Communications System having Overlapping Receiver coverage Zones" to Freeburg and U.S. Pat. No. 4,881,271, issued Nov. 14, 1989, entitled "Portable Wireless Communication Systems" to Yamauchi et al. Yamauchi et al. provide for a hand-off of a subscriber station from one base station to another by the base station continually monitoring the signal strength of the subscriber station.

The following U.S. patents teach various aspects of wireless communication networks.

In U.S. Pat. No. 4,792,946, issued Dec. 20, 1988, entitled "Wireless Local Area Network for Use in Neighborhoods" S. Mayo describes a local area network that includes transceiver stations serially coupled together in a loop.

In U.S. Pat. No. 4,777,633, issued Oct. 11, 1988, entitled "Base Station for Wireless Digital Telephone System" Fletcher et al. describe a base station that communicates with subscriber stations by employing a slotted communications protocol.

In U.S. Pat. No. 4,730,310, issued Mar. 8, 1988, entitled "Terrestrial Communications System" Acampora et al. describe a communications system that employs spot beams, TDMA and frequency reuse to provide communication between a base station and remote stations.

In U.S. Pat. No. 4,655,519, issued May 12, 1987, entitled "Wireless Computer Modem" Kirchner et al. disclose a wireless modem for transferring data in a computer local area network.

In U.S. Pat. No. 4,639,914, issued Jan. 27, 1987, entitled "Wireless PBX/LAN System with Optimum Combining" Winters discloses a wireless LAN system that employs adaptive signal processing to dynamically reassign a user from one channel to another.

In U.S. Pat. No. 4,837,858, issued Jun. 6, 1989, entitled "Subscriber Unit for a Trunked Voice/Data Communication System" Ablay et al. disclose a trunked voice/data subscriber that operates in either a voice mode or one of three data modes.

In U.S. Pat. No. 4,852,122, issued Jul. 25, 1989, entitled "Modem Suited for Wireless Communication Channel Use" Nelson et al. disclose a wireless communication system and, specifically, a modem that communicates digital data with data terminal equipment.

In U.S. Pat. No. 4,926,495, issued May 15, 1990 entitled "Computer Aided Dispatch System" Comroe et al disclose a computer aided dispatch system that includes a master file node and a plurality of user nodes. The master file node maintains a record for each subscriber and automatically transmits an updated record to each dispatcher attached to a subgroup in which the subscriber operates.

In U.S. Pat. No. 4,456,793, issued Jun. 26, 1984, W. E. Baker et al. describe a cordless telephone system having infrared wireless links between handsets and transponders. The transponders are wired to subsystem controllers which are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay describes a LAN wherein users communicate with RF or IR signals with an assigned Regional Bus Interface Unit (RBIU). Protocols such as CSMA/CD and slotted ALOHA are employed in communicating with the RBIUs.

In commonly assigned U.S. Pat. No. 4,402,090, issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In IBM Technical Disclosure Bulletin, Vol. 20, No. 7, December 1977 F. Closs et al. describe the use of both line-of-sight and diffuse transmission of infrared signals for wireless communications between a ceiling-based controller and a plurality of terminals.

In IBM Technical Disclosure Bulletin, Vol. 24, No. 8, page 4043, January 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

What is not taught by this prior art, and what is thus an object of the invention to provide, are communication methodologies that realize an efficient scheduling and frequency reuse in a wireless communications network that is served by a wired network.

SUMMARY OF THE INVENTION

The foregoing and other problems are overcome and the object of the invention is realized by a method for managing wireless communications in a wireless communications network having a plurality of communications cells, at least two of which are overlapping with one another. The wireless communications network is of a type having a plurality of header stations in bidirectional wireless communication with one or more mobile communication units and also in bidirectional communication with a wired network. In accordance with the invention the method includes a first step of receiving a message from the wired network with at least one of the header stations. The message is a message type that authorizes a header station or header stations to transmit on the wireless network. A second step of the method is accomplished in response to the received message and initiates wireless communications with any mobile units that are located within a communication cell served by at least one header station.

One method of the invention circulates a high priority token amongst a plurality of the header stations that are connected to a wired network such as, but not limited to, a token ring network. Reception of the token causes the receiving header station to perform wireless communications. When finished, the header station forwards the token to another header station.

Another method of the invention allocates header stations to different groups, the members of each group having disjoint communication cells. This method includes the steps of (a) determining which communication cells overlap other communication cells; (b) deriving a graph structure having vertices corresponding to the communication cells, the vertices being interconnected as a function of whether a given communication cell overlaps another communication cell; and (c) executing a graph coloring technique to group the vertices into a plurality of groups, wherein each group is comprised of disjoint communication cells. The grouping information is maintained by a network controller that, during operation, activates in parallel all of the header stations of each group for performing wireless communications, the groups being activated in succession and repetitively.

BRIEF DESCRIPTION OF THE DRAWING

The above set forth and other features of the invention are made more apparent in the ensuing Detailed Description of the Invention when read in conjunction with the attached Drawing, wherein:

FIG. 1b is a block diagram illustrating one of the header stations of FIG. 1a;

FIG. 1c is a block diagram illustrating one of the mobile communication units of FIG. 1a;

DETAILED DESCRIPTION OF THE INVENTION

Figure 1A:
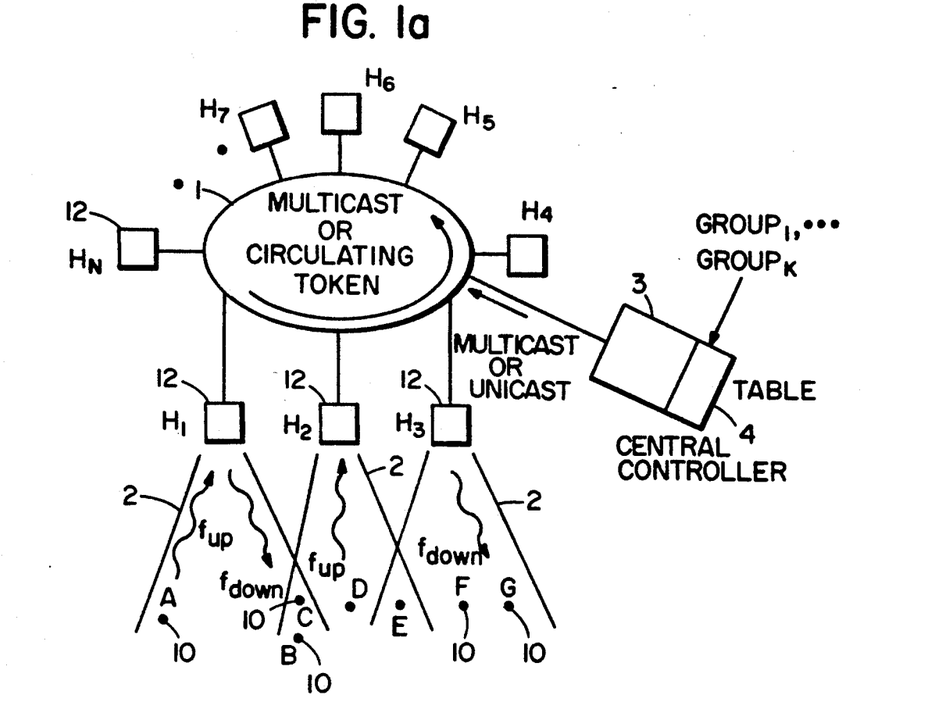
FIG. 1a is a schematic representation of a token ring LAN having a plurality of header stations and a wireless network having overlapping communication cells within which mobile communication units freely migrate.

Referring to FIG. 1 there is shown a typical mobile office communication environment. Users having portable data processing devices, referred to herein as mobile communication units or mobile units 10, are not restricted to gain access to a token-ring communication network 1 via predetermined homing points. Instead, there are provided a finite number of devices, referred to herein as header stations 12, that are attached to the token-ring network 1 at specific points. Each header station 12 has both processing and storage capability to perform store-and-forward communication functions. Each header station 12 functions as a bridge between the wired token-ring LAN and a collection of mobile units 10. The mobile units 10 are in bidirectional communication with the header stations 12 using wireless communication links. Within an area of wireless coverage of a header station, or communication cell 2, the mobile units 10 transmit on a shared uplink at a first frequency ($f_{up}$) and receive messages on a broadcast downlink channel from the header station 12 at a second frequency ($f_{down}$). The same frequencies ($f_{up}$) and ($f_{down}$) are reused within each cell in the multicell wireless network.

One suitable token ring network for practicing the teaching of the invention is disclosed in "IBM Token-Ring Network:Architecture Reference", SC30-3374-02, Third Edition, Sep. 1989 ("IBM" is a registered trademark of the International Business Machines Corporation). It should be realized however that the teaching of the invention is not restricted to only this particular network configuration or to token ring networks in general but may, instead, be practiced with a number of different wired network types.

Each mobile unit (N) is associated with a unique header station (12), denoted as Owner (N), through which the mobile unit 10 accesses the wired token-ring network. A given header station (H) may own multiple mobile units 10 at the same time. The set of mobile units 10 owned by header station (H) is denoted Domain(H).

A suitable method for managing the ownership of the mobile units 10 is disclosed in commonly assigned U.S. Patent application Ser. No. 07/605,723, filed on Oct. 29, 1990 and entitled "Distributed Control Methods for Management of Migrating Data Stations in a Wireless Communications Network" by Kadathur S. Natarajan.

The Owner-Domain relationships are logical and indicate for each header station (H) the set of mobile units 10 whose communication needs are managed by H. However, when a mobile unit 10 is in an overlapping area, its uplink transmissions can be heard by more than one header station 12, including its present owner and all potential owners in whose cells it is located. For example, in FIG. 1, uplink transmissions from B may interfere with transmissions by A, C, D and E. However B does not interfere with F because B and F can never transmit to the same header station 12. For the same reason, B and G do not interfere with one another. The interference is not limited to uplink transmissions alone. A mobile unit 10, such as B, that is within an overlapping cell area can receive broadcast signals from multiple header stations 12 (B can receive from both $H_1$ and $H_2$). If a mobile unit 10 simultaneously receives broadcast messages from more than one header station 12 a collision occurs and the messages are received erroneously.

Thus, the transmission and reception of messages in a cell of a multicell network of the type that employs identical communication frequencies in different cells requires control of interference. This interference may arise from several sources including an uplink transmission from mobile units 10 that lie in overlapping areas between adjacent cells 2 and from downlink transmissions from header stations 12 if their overlapping cell areas contain one or more mobile units 10.

Figure 1B:
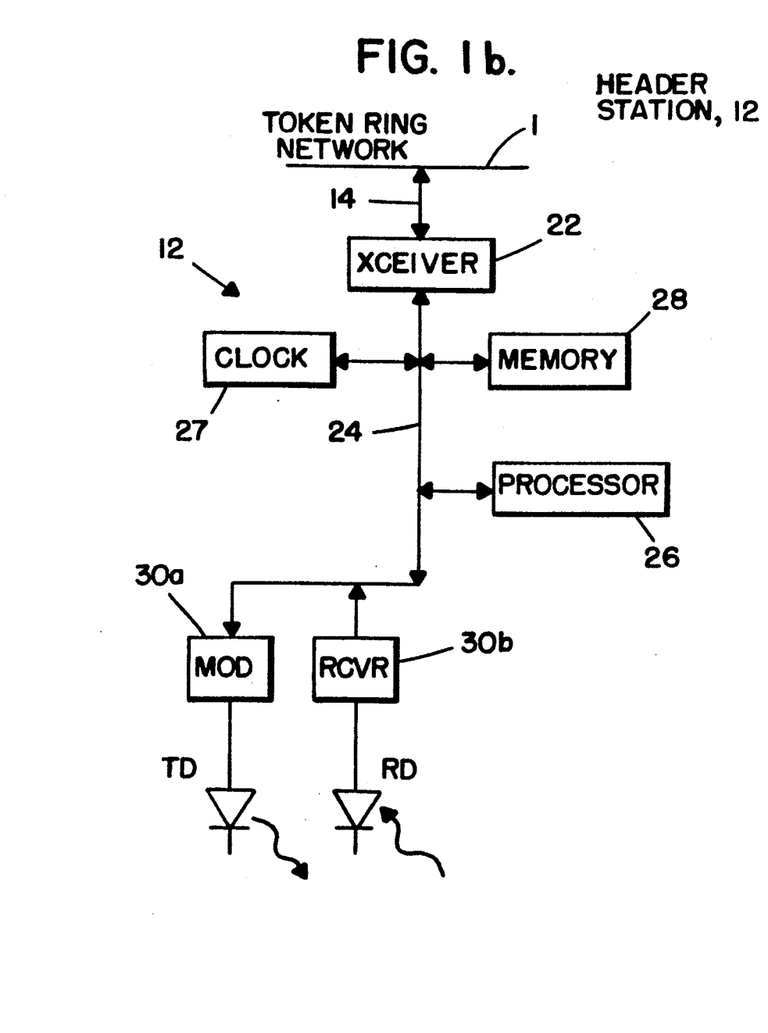
Figure 1C:
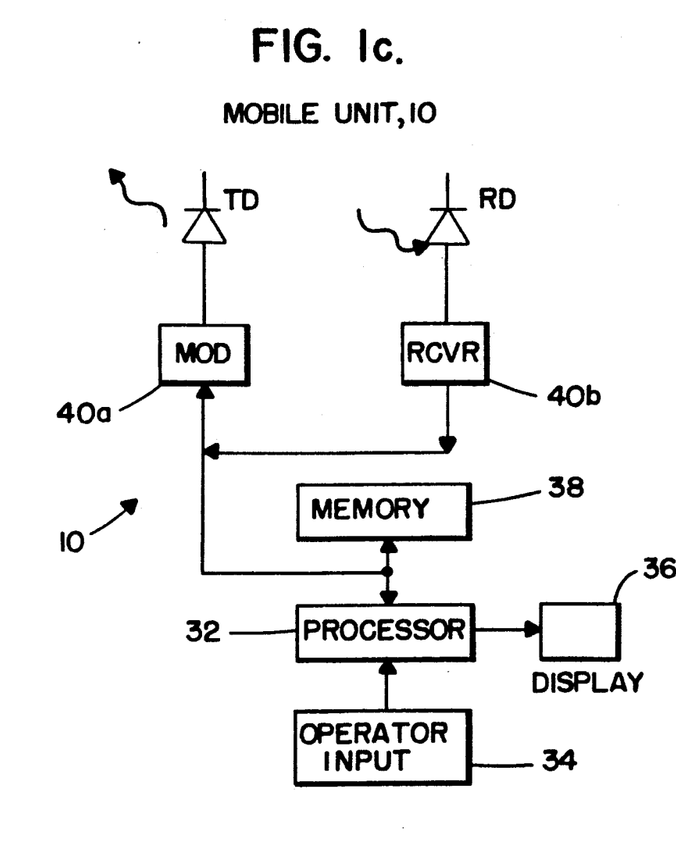

Before discussing the methods of the invention in further detail reference is made to FIGS. 1b and 1c wherein embodiments of the header stations 12 and mobile units 10, respectively, are shown in block diagram form. In a presently preferred embodiment of the invention the wireless communications channels are carried via an infrared (IR) data link. Presently available optical devices readily provide for operation within the range of approximately 750 nanometers to approximately 1000 nanometers.

Referring to FIG. 1b there is shown a simplified block diagram of the header station 12. The header station 12 is coupled to the LAN 1 via a connector 14. Connector 14 is coupled to a network adapter transceiver 22 which in turn is coupled to an internal bus 24. The header station 12 includes a processor 26 that is bidirectionally coupled to a memory 28 that stores program-related and other data, including packets of data transmitted to or received from the mobile units 10. Processor 26 also communicates with IR modulators and receivers; specifically a modulator 30a and a receiver 30b. The IR modulator and receiver have inputs coupled to suitable infrared emitting or receiving devices such as laser diodes, LEDs and photodetectors. In the illustrated embodiment the modulator 30a has an output coupled to a transmit diode (TD) and the receiver 30b has an input coupled to a receive photodiode (RD).

Referring now to FIG. 1c there is shown in block diagram form an embodiment of the mobile unit 10. Mobile unit 10 includes a processor 32 coupled to an operator input device 34 and also coupled to an operator display device 36. Operator input device 34 may be a keyboard or any suitable data entry means. Similarly, operator display device 36 may be a flat panel alphanumeric display or any suitable display means. Also coupled to processor 32 is a memory 38 that stores program-related data and other data, such as packets of information received from or intended to be transmitted to the header station 12 and also an identification of the mobile unit 10. Also coupled to processor 32 are a modulator 40a and a receiver 40b. The data receivers of FIGS. 1b and 1c include demodulators and filters and operate in a conventional manner to extract the modulated bit stream from the received optical signals. Similarly, the modulators of FIGS. 1b and 1c operate in a conventional manner to modulate the optical output in accordance with a transmitted bit stream. A preferred data transmission rate is in the range of approximately one to ten million bits per second (1-10 Mbits/sec), although any suitable data transmission rate may be employed.

In the optical communication system of the invention all wireless communication is between the header station 12 and the mobile units 10. There is no direct communication between the mobile units 10.

Although described in the context of a wireless network employing an IR medium it should be realized that the method of the invention may also be practiced with other types of wireless networks that employ, by example, radio frequency (RF) and microwave mediums.

Figure 3:
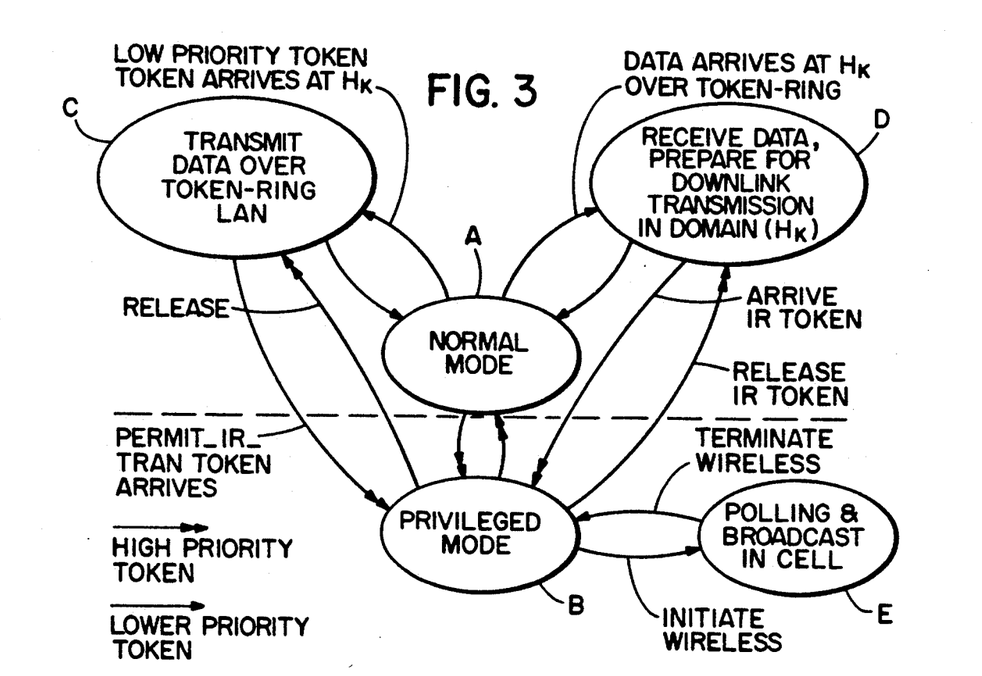
FIG. 3 is a state diagram showing various possible logical states of a header station, including a privileged state invoked upon receipt of the privileged token.

Referring now to FIG. 1 in conjunction with FIG. 3 the token-ring network 1 has a set of attached header stations ($H_1$, $H_2$, ... $H_n$). One feature of the token-ring network 1 is that the network transports messages having various priority levels. In the present invention, a high priority message referred to as Permit Wireless Transmission (PERMIT_WIRELESS_TRAN) is circulated. When an individual header station 12 ($H_k$) receives the PERMIT_WIRELESS_TRAN message the receiving header station 12 exits a Normal State (A) of operation and enters a Privileged State (B) of operation.

In the Normal State (A) the header station 12 performs the tasks of transmitting data and lower priority tokens over the network 1 (State C) and also the tasks of receiving and buffering data addressed to a mobile unit 10 within the domain of $H_k$ (State D).

Figure 2:
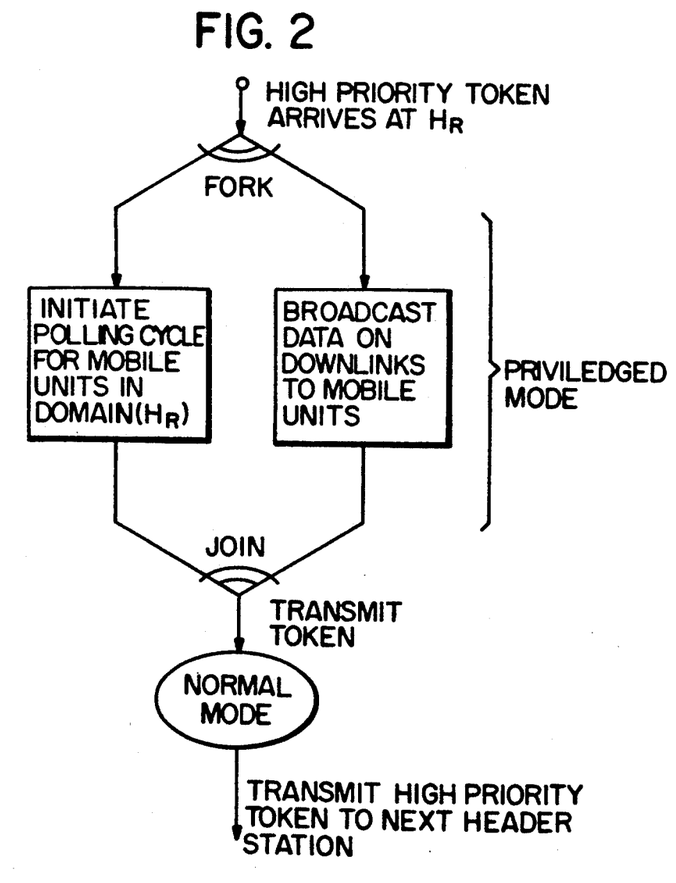
FIG. 2 illustrates a response of a header station to an arrival of a privileged token.

In one embodiment while in the Privileged State (B) the header station 12 is enabled to execute a protocol, as shown in FIG. 2, to broadcast to and also to poll the mobile units of its domain to elicit uplink transmissions from mobile units having data to transmit (E).

When the wireless operations are complete within the cell the header station 12 releases the PERMIT_WIRELESS_TRAN token, i.e., the token is passed on to the next header station 12 on the token ring. In FIG. 3, the states shown above the dotted line indicate that the header station 12 can be receiving and/or transmitting data on the wired token-ring network 1 in a manner unrelated to wireless operations. Insofar as the wired token-ring network 1 is concerned, the header station 12 appears as another workstation physically connected to the LAN.

The protocol illustrated in FIG. 2 is one suitable protocol wherein the header station 12 polls the individual mobile units 10 in sequence for uplink transmissions and simultaneously, or subsequently, broadcasts messages on the downlink to the mobile units 10, depending upon the multiple access protocol in effect.

Other suitable methods for polling the mobile units 10 are disclosed in commonly assigned U.S. patent application Ser. No. 07/605,285, filed on Oct. 29, 1990 and entitled "Methods for Polling Mobile Users in a Multiple Cell Wireless Network" by Kadathur S. Natarajan et al.

After the polling and broadcast operations are complete the header station 12 terminates wireless operations. The header station then transmits the high priority PERMIT_WIRELESS_TRAN message to the next header station 12 on the token ring network 1. The next header station 12 that receives the high priority token then enters the privileged mode of wireless communication and communicates in a similar manner with the mobile units 10 of its associated domain.

In greater detail, as the PERMIT_WIRELESS_TRAN token circulates around the network 1 the token is received by the header station $H_1$. $H_1$ enters the privileged mode and polls in sequence the individual mobile units 10 that currently comprise the domain of $H_1$. In accordance with FIG. 1, let the set of mobile units 10 in the domain of $H_1$ be comprised of {A, B, C}, let the mobile units 10 in the domain of $H_2$ be {D, E} and let the set of mobile units 10 in the domain of $H_3$ be {F,G}. When $H_1$ possesses the PERMIT_WIRELESS_TRAN token it polls in succession mobile unit A then B then C. Polling a specific mobile unit 10, for example A, involves sending downlink a polling message to mobile unit A and then waiting for immediate response from A. If no response is forthcoming, the polling message is sent to B. However, if mobile unit A responds to the downlink polling message with an uplink transmission, then $H_1$ waits until the uplink transmission is complete before polling mobile unit B.

After header station $H_1$ completes the polling of all mobile units 10 within its domain it passes the PERMIT_WIRELESS_TRAN token to the next node on the token-ring network 1. If the next node is another header station ($H_2$) then $H_2$ will poll the mobile units 10 in its domain {D,E} at that time. After $H_2$ finishes polling all of the associated mobile units 10, the token is passed on to the next node on the ring. After the PERMIT_WIRELESS_TRAN token returns back to the header station $H_1$, $H_1$ once more enters the States B and E of FIG. 3. If a node that receives the PERMIT_WIRELESS_TRAN token is other than a header station 12 then the token may be immediately routed back to the token-ring network 1. As such, header stations 12 may be interspersed with other types of network devices, such as a Central Controller 3 that is shown in FIG. 1.

In summary, this first method of the invention achieves effective control of wireless communication through the agency of a circulating privileged token. By definition only a single wireless cell can be active at any given time. Thus the problems of uplink interference between mobile units and downlink interference between header stations is eliminated.

There is now described a second method of the invention that achieves efficient frequency reuse in a wireless communications system having overlapping cells. This second method provides conflict-free transmissions in the wireless portion of the network system and also provides efficient reuse of bandwidth in spatially disjoint cells of the wireless network.

Figure 7:
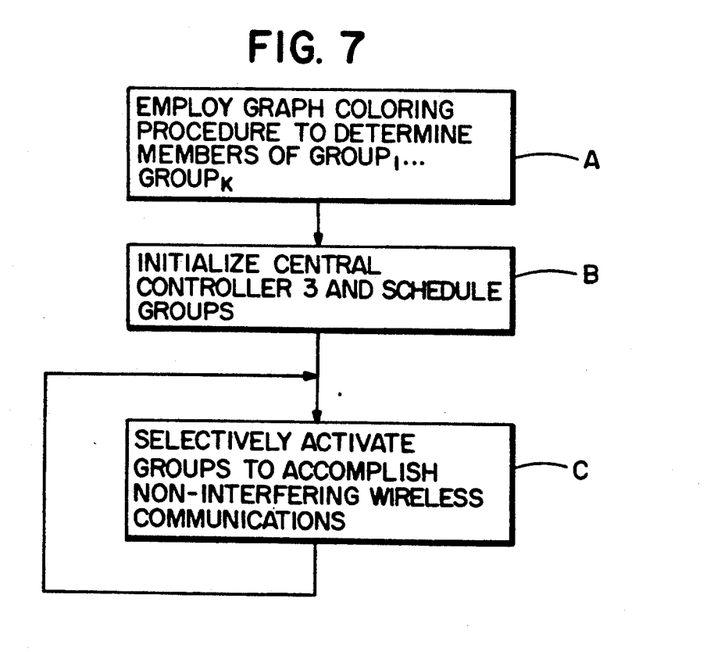
FIG. 7 is a flowchart illustrating a method of allocating header stations to groups.

Steps of the second method of the invention are shown in the flowchart of FIG. 7 and are described below.

Step A. An off-line procedure P1 is employed, based on a knowledge of the positions of the cells 2 of the network 1, to determine which cells of the wireless network can simultaneously conduct wireless communication without interfering with one other.

Step B. The results of P1 are used to initialize a Table 4 in the Centralized Controller 3, typically a data processor, that is attached to the token-ring network 1. The Controller 3 utilizes the Table 4 and derives therefrom a schedule to obtain interference free simultaneous wireless operations in disjoint cells of the network. Two cells are considered to be disjoint when they do not overlap in a manner that would result in interference if both cells were simultaneously active.

Step C. The Controller 3 selectively activates header stations associated with the disjoint cells in accordance with the derived schedule.

These Steps (A-C) are now described in greater detail.

Step A

Figure 4:
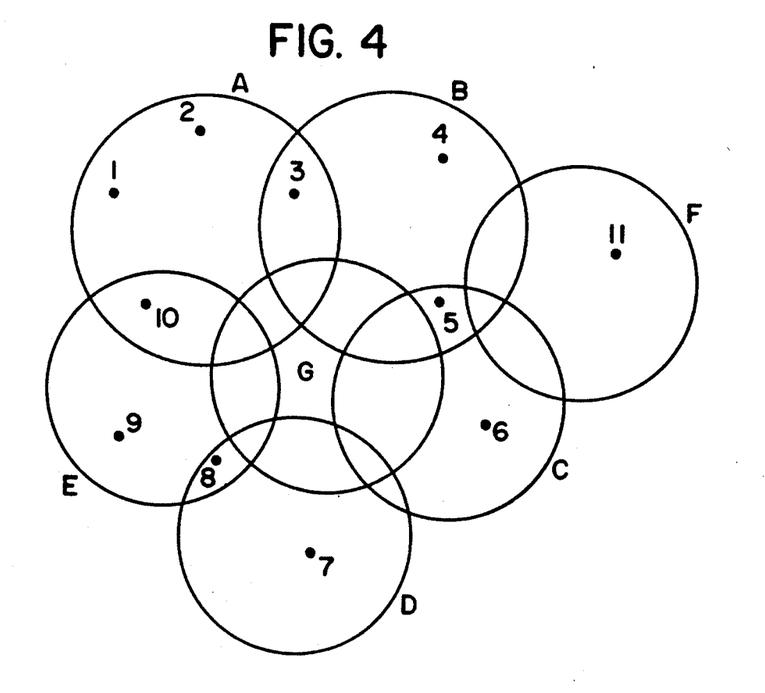
FIG. 4 illustrates a multiple cell wireless network having overlapping communication cells and mobile communication units distributed within the cells.
Figure 5:
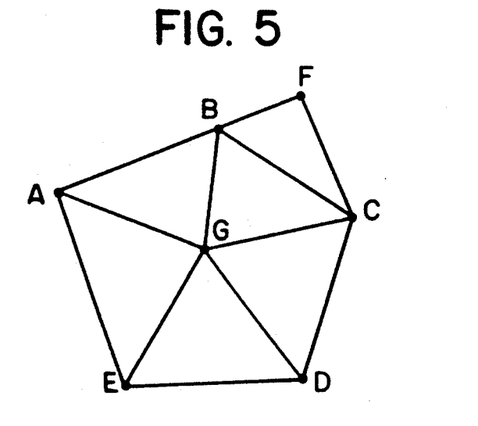
FIG. 5 is a Region Interference Graph of the network of FIG. 4.

For the purpose of illustration consider a multi-cell wireless network shown in FIG. 4. The network consists of a set of seven cells {A,B,C,D,E,F,G,} and 11 mobile units 10 numbered one through 11. Given the predetermined knowledge of cells and their overlap characteristics, there is defined a Region Interference Graph, or RIG, as follows. The RIG has a plurality of vertices, each of which corresponds to a single cell of the multicell network. Two vertices of the RIG are considered to be connected if and only if the corresponding cells provide overlapping coverage, that is, if simultaneous wireless communication in the cells will interfere with one another. The RIG corresponding to the network of FIG. 4 is shown in FIG. 5 and has seven vertices, corresponding to the seven cells (A-G) of FIG. 4.

The purpose of Procedure PI is to group the cells into a collection of disjoint sets of cells. This is preferably accomplished by solving a Graph Coloring problem using an optimal or near-optimal number of colors.

A number of suitable Graph Coloring techniques are known in the art. By example, reference is made to the teaching of the following: (1) D. Brelaz, "New Methods to Color Vertices of a Graph", Communications of the ACM, 22, 1979, pp. 251-256; (2) F. T. Leighton, "A Graph Coloring Algorithm for Large Scheduling Problems" Journal of Research National Bureau of Standards, 84, 1979, pp. 489-506; and (3) M. Chamz, A. Hertz and D. De Werra, "Some Experiments with Simulated Annealing for Coloring Graphs", European Journal of Operations Research, 32, 1987, pp. 260-266. For the purposes of the invention, any Graph Coloring technique that achieves optimal or near-optimal coloring in a reasonable amount of running time is suitable.

Generally, the Graph Coloring problem can be expressed as follows:

Given a graph $G=(V,E)$ and an integer K, is there a function color: $V \rightarrow \{1,2,...,K\}$ such that $(v,w) \epsilon E => color(v) \neq color(w)$ ?

An optimal coloring of the graph uses as small a value of K as possible.

A minimum coloring solution for the graph of FIG. 5 is as follows (red=1, blue=2, green=3, black=4).
 color(F)=color(D)=red
 color(B)=color(E)=blue
 color(A)=color(C)=green
 color(G)=black Vertices that are assigned identical colors correspond to cells of the network that do not overlap. Groups of disjoint cells that are identified by solving the Graph Coloring problem are referred to herein as Group$_1$, Group$_2$,..., Group$_k$. A given header station can only be a member of one Group.

As described below refinements to this technique employ weights associated with the nodes of the graph, the weights corresponding to message traffic intensities.

Step B

The Central Controller 3 is initialized with the results computed by the Graph Coloring Algorithm, also referred to above as Procedure 1. That is, the Central Controller 3 stores in Table 4 a data structure expressive of the Groups of cells as determined from Procedure 1.

Step C

After being initialized the Central Controller 3 sends a high-priority multicast message, referred to herein as START_WIRELESS_OPER, to all of the header stations 12 that are members of Group$_1$. Each header station 12 that belongs to Group$_1$, upon receipt of the START_WIRELESS_OPER message, initiates wireless transmission and reception operations with the mobile units 10 within its associated cell. The wireless operations include multiple access uplink transmissions from the mobile units 10 as well as broadcast transmissions on the downlink from the header stations 12 to the mobile units 10.

The header station 12 can terminate the downlink transmission using one of three application dependent criteria: (a) exhaustive service (b) limited service or (c) gated service. In exhaustive service the header station 12 remains in the broadcast mode until all buffered frames of data are transmitted, including any that may have arrived from the wired network during the present broadcast cycle. In limited service the header station 12 remains in the broadcast mode for either a predetermined maximum amount of time or until some predetermined number of frames have been broadcast. If frames remain to be broadcast they remain buffered until the next communication cycle. Gated service is similar to exhaustive service except that only those frames that are buffered at the beginning of the broadcast phase are transmitted. That is, any that arrive during the present broadcast phase are buffered for transmission during a next communication cycle.

Whichever of these three criteria are employed, the header station 12 sends upon completion a high-priority message, referred to herein as COMPLETED_WIRELESS_OPER, to the Central Controller 3.

Figure 6:
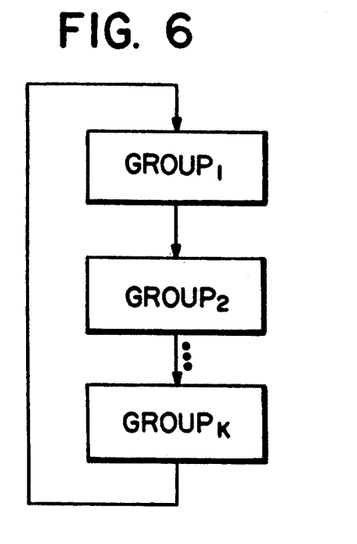
FIG. 6 illustrates a sequence of header station group activations controlled by a LAN central controller.

After the Central Controller 3 receives the COMPLETED_WIRELESS_OPER message from all header stations 12 in Group$_1$ it sends the high-priority, multicast message START_WIRELESS_OPER to all header stations 12 that are members of Group$_2$. In response to the reception of the message the header stations 12 in Group$_2$ initiate in parallel conflict-free wireless operations within their respective domains. The operations proceed as described above for Group$_1$. After the Central Controller 3 receives the COMPLETED_WIRELESS_OPER message from all header stations 12 in Group$_2$ wireless communication is conducted in cells comprising Group$_3$. A cycle of wireless operations is completed when all of the cells comprising Group$_k$ send their COMPLETED_WIRELESS_OPER messages to the Central Controller 3. At this time, another cycle of wireless communication is initiated by the Central Controller 3 within the cells of Group$_1$ followed by 30 cells of Group$_2$ and so on. As can be seen in FIG. 6, the Central Controller 3 repetitively cycles through the groups, activating the header stations of each in succession.

This method of the invention provides efficient bandwidth reuse in the wireless portion of the network. If there are N wireless cells in the network, a best case is achieved when all N cells are totally disjoint from one another. In such a situation, all N cells can conduct wireless operations at all times in a conflict-free manner. In a more typical wireless environment some overlap between cells is expected. For example, if each cell overlaps with two other cells then N header stations 12 may be partitioned into 3 disjoint groups and at any given time an average of N/3 header stations may be conducting wireless operations. If the token-ring network 1 has a data transmission rate of 16 Mbits/sec and there are 30 header stations, each with a shared uplink of 1 Mbit/sec, that are divided into 3 disjoint groups, the effective uplink bandwidth is 10 Mbits/sec.

It should be realized that the teaching of the invention is not limited to only Graph Coloring techniques to statically determine a non-interfering order of cell activations. Also, and as was previously noted, a static scheduling technique may also employ weights representative of message traffic intensity.

For example, the intensity of traffic, that is, the number of packets of traffic to be communicated per unit time, may vary from cell to cell depending upon the number of mobile units 10 within a cell, the nature of the application generating the traffic, etc. If such information is known then a certain weight ($\lambda_N$) can be associated with a node N of the the RIG of FIG. 5 to reflect the traffic intensity. The partitioning of the RIG is thus formulated as the following generalized static scheduling problem.

Given a Region Interference Graph G (V.E.) determine an integer K and a partition of the vertex set into a family of subsets {Group$_1$, Group$_2$,..., Group$_K$} such that each Group$_i$ ($1 \leq i \leq K$) is an independent set and the following objective function is minimized:

$$\sum_{i=1}^{K} \lambda(\text{Group}_i),$$

where, $\lambda$ (Group$_i$)=max$\{\lambda_N | N \epsilon \text{Group } i\}$.

Further by example a combination of static scheduling techniques may be employed. For example, the static graph coloring procedure is first used. After gaining experience with the network thus scheduled the following average values for communication traffic is determined for the RIG vertices: A=10 messages/sec, B=5 messages/sec, C =10 messages/sec, D≦10 messages/sec, E=10 messages/sec, F=2 messages/sec and G=1 message/sec.

Using the average values of message traffic the controller 3 revises the scheduling table to provide activation group sequences that minimize the total time to service all of the header stations as measured in message unit times. A next group is not started until all of the header stations of the preceding group have completed. For example, the optimal group sequence of AD, followed by CE, followed by B, followed by FG can be shown to require 27 total message time units whereas a non-optimal group sequence is represented by AF, followed by EC, followed by BD, followed by G, which can be shown to require 31 total message time units to complete.

Also, the invention is not limited to only static scheduling methods. For example, a dynamic scheduling technique can also be employed. Referring to the interference graph of FIG. 5, vertices A, D and F form an independent set in that they are not directly connected by an edge. The controller 3 first enables vertices A, D and F to begin wireless communication. Assuming that A completes first the controller 3 then examines other vertices to determine if another may be enabled without interfering with the transmissions of D and F. If no other vertices exist further activations must wait, otherwise the controller 3 immediately activates another non-conflicting header station. For the example given no other header station can be enabled when A finishes without conflicting with D or F. Assuming that F finishes next the controller 3 enables B in that B and F also form an independent set and their transmissions are non-interfering.

It should also be noted that as described above the scheduling is controlled such that all cells of a group must complete their wireless operations before cells within another group are permitted to perform wireless operations. However, modifications of the method are also within the scope of the invention. For example, a traffic load dependent scheduling technique can also be employed by the Central Controller 3 to initiate wireless operation in a given cell so long as it does not conflict with any ongoing wireless operation within other cells. Such refinements incorporate mechanisms for ensuring a measure of fairness so that each cell has an opportunity to perform wireless operations.

While wireless communication is occurring in the cells the token-ring network 1 is at the same time available for normal data communication. The overhead control traffic due to transmission of the high-priority control messages START_WIRELESS_OPER and COMPLETED_WIRELESS_OPER is generally negligible.

It should also be noted that although the invention has been described in the context of a token-ring network that other well known network configurations can also be employed. For example, a star network having the Central Controller 3 connected as a hub node can also be used. For certain of these alternate network configurations all message traffic is routed through the Central Controller 3.

Also, all cells may be considered to overlap all other cells, thereby making the first method of sequential activations a subset of the second wherein at most one cell is scheduled for activation at any given time.

Thus, and while the invention has been particularly shown and described with respect to preferred embodiments thereof, it will be understood by those skilled in the art that changes in form and details may be made therein without departing from the scope and spirit of the invention.

Having thus described my invention, what I claim as new, and desire to secure by letters Patent is:

1. A method for managing wireless communications in a wireless communications network comprised of a plurality of communications cells, the wireless communications network having a plurality of header stations each of which includes means for performing bidirectional wireless communication with one or more mobile communication units, each of the plurality of header stations also including means for performing bidirectional communication with a wired network, comprising the steps of:

receiving information with at lest one of the plurality of header stations, the information being received from the wired network and stored within the header station for subsequent transmission to the wireless communications network;

periodically receiving a first message from the wired network with the at least one of the plurality of header stations, the first message being a message type that authorizes only a header station that receives the first message to initiate wireless communications on the wireless network;

in response to the received first message, initiating wireless communications with the mobile communication units that are located within a communication cell served by the header station that receives the first message, the step of initiating wireless communications including a step of transmitting the stored information to the wireless communications network; and in response to the header station that received the first message subsequently terminating wireless communications, transmitting the first message from the header station that terminates wireless communications to the wired network for reception by a second header station for authorizing only the second header station to initiate wireless communications on the wireless network.

2. A method as set forth in claim 1 wherein the first message is received from another header station that is coupled to the wired network.

3. A method as set forth in claim 1 wherein the first message is received y the at least one header station from a network controlling means that is coupled to the wired network.

4. A method as set forth in claim 1 wherein the steps of receiving and initiating are accomplished in parallel by a group of header stations, and wherein the method includes an initial step of selecting particular ones of the plurality of header stations for membership within the group.

5. A method as set forth in claim 1 wherein the steps of receiving and initiating are accomplished in parallel by a group of header stations, ad wherein the method includes an initial step of selecting particular ones of the header stations for membership within one of the plurality of groups, the step of selecting including the steps of:

determining which communication cells overlap other communication cells;

deriving a graph structure having vertices each of which corresponds to one of the communication cells, the vertices being interconnected as a function of whether a given communication cell overlaps another communication cell; and executing a graph coloring technique to group the vertices into a plurality of groups, wherein each group is comprised of one or more header stations having a communication cell that does not overlap a communication cell of other members of the group.

6. A method as set forth in claim 1 wherein the step of receiving receives a high priority message token from a wired token ring network.

7. A method as set forth in claim 1 wherein the step of initiating includes a step of activating an IR source for transmitting wireless communications to the wireless communications network.

8. A method as set forth in claim 1 wherein the steps of receiving and initiating are accomplished in parallel by a group of header stations, and wherein the method includes an initial step of electing particular ones of the header stations for membership within one of the plurality of groups, the initial step of selecting including the steps of:
- determining which communication cells overlap other communication cells;
- deriving a graph structure having vertices each of which corresponds to one of the communication cells, the vertices being interconnected as a function of whether a given communication cell overlaps another communication cell; and
- scheduling activations of the communications cells for wireless communications by grouping the vertices into a plurality of groups, wherein each group is comprised of one or more header stations having a communication cell that does not overlap a communication cell of other members of the group.

9. A method as set forth in claim 1 wherein the firs message is generated by a network control means at periodic intervals, the period between generation of the first messages being a function of an amount of wireless communication occurring within the communication cells.

10. A method as set forth in claim 1 wherein the first message is generated by a network control means at periodic intervals, the period between generation of the first messages being a function of a predetermined schedule.

11. A method for managing wireless communications in a wireless communications network comprised of a plurality of communications cells, the wireless communications network having a plurality of header stations each of which includes means for performing bidirectional wireless communication with one or more mobile communication units, each of the plurality of header stations also including means for performing bidirectional communication with a wired network, comprising the steps of:
- receiving information with at lest one of the plurality of header stations, the information being received from the wired network and stored within the header station for subsequent transmission to the wireless communications network;
- periodically receiving a first message from the wired network with the at least one of the plurality of header stations, the first message being a message type that authorizes only a header station that receives the first message to initiate wireless communications on the wireless network; and
- in response to the received first message, initiating wireless communications with the mobile communication units that are located within a communication cell served by the header station that receives the first message, the step of initiating wireless communications including a step of transmitting the stored information to the wireless communications network;
- wherein the first message is received by the at least one header station from a network controlling means that is coupled to the wired network, and further comprising a step of, in response to a header station that received the first message subsequently terminating wireless communications, transmitting a second message from the header station that terminates wireless communication to the wired network for reception by the network controlling means, the second message being a message type that indicates that the header station has completed wireless communications with all or some of the mobile communication units located within the communication cell served by the header station.

12. A method as set forth in claim 11 wherein the second message is transmitted to the wired network after a predetermined interval of time, the predetermined interval of time having a duration that is independent of an amount of wireless communication traffic that is associated with the header station that transmits the second message.

13. A method as set forth in claim 11 wherein the second message is transmitted to the wired network after a variable interval of time, the variable interval of time having a duration that is dependent upon an amount of wireless communication traffic that is associated with the header station that transmits the second message.

14. A method as set forth in claim 11 wherein the first message is generated by the network controlling means at periodic intervals, the period between generation of the first message being a function of an amount of wireless communication occurring within the communication cells.

15. A method as set forth in claim 11 wherein the first message is generated by the network controlling means at periodic intervals, the period between generation of first messages being a function of a predetermined schedule.

16. A method for managing wireless communications in a wireless communications network comprised of a plurality of communications cells, the wireless communications network having a plurality of header stations each of which includes means for performing bidirectional wireless communication with one or more mobile communication units, each of the plurality of header stations also including means for performing bidirectional communication with a wired network, comprising the steps of:
- receiving a first message from the wired network with at least one of the plurality of header stations, the first message being a message type that authorizes a header stations that receives the first message to initiate wireless communications on the wireless network; and
- in response to the received first message, initiating wireless communications with the mobile communication units that are located within a communication cell served by the header station that receives the first message, wherein
- the steps of receiving and initiating are accomplished in parallel by a group of header stations, and wherein the method includes an initial step of selecting particular ones of the plurality of header stations for membership within the group.

17. A method as set forth in claim 16 wherein the initial step of selecting includes the steps of:
- determining which communication cells, if any, overlap one another; and
- selecting for membership within the groups only those header stations having a communication cell that does not overlap a communication cell of any other header station within the group.

18. A method as set forth in claim 17 and further comprising the step of forming a plurality of groups of header stations such that each of the plurality of header stations is assigned to at least one group.

19. A method as set forth in claim 16 wherein the initial step of selecting including the steps of:
   determining which communication cells overlap other communication cells;
   deriving a graph structure having vertices each of which corresponds to one of the communication cells, the vertices being interconnected as a function of whether a given communication cell overlaps another communication cell; and
   scheduling activations of the communications cells for wireless communications by grouping the vertices into a plurality of groups, wherein each group is comprised of one or more header stations having a communication cell that does not overlap a communication cell of other members of the group.

20. A method as set forth in claim 19 wherein the method further includes the steps of:
   determining an amount of message traffic associated with each communication cell; and
   rescheduling activations of the communications cells as a function of the determined amount of message traffic.

21. A method as set forth in claim 19 and including a step of storing a data structure expressive of the groups, the data structure being stored within a network controlling means that is coupled to the wired network; and further including a step of employing the network controlling means to periodically send the first message to the open or more header stations that are members of one of the groups.

22. A data communications system, comprising:
   a wired communication network;
   a wireless communications network comprised of a plurality of header stations, each of said header stations having a wireless communications coverage area associated therewith, each of said header stations including,
   means for performing bidirectional wireless communications with one or more mobile communication units that are located within the associated wireless communications coverage area;
   means for performing bidirectional communication with the wired network, including means for receiving information from the wired network for transmission to a mobile communications unit;
   means for storing the received information for subsequent transmission to the mobile communication unit;
   means, responsive to a first message that is periodically received from the wired network, for initiating wireless communications with at lest one mobile communication unit that is located within the associated wireless communications coverage area, said initiating means including means for transmitting the stored information to the mobile communication unit; and
   control means that is coupled to the wired network for periodically transmitting the first message thereto, said control means including means for periodically transmitting the first message to all members of a group of header stations, the members of the group being selected as having wireless communications coverage areas that doe not overlap one another.

23. A data communications system, comprising:
   a wired communication network;
   a wireless communications network comprised of a plurality of header stations, each of said header stations having a wireless communications coverage area associated therewith, each of said header stations including,
   means for performing bidirectional wireless communications with one or more mobile communication units that are located within the associated wireless communications coverage area;
   means for performing bidirectional communication with the wired network, including means for receiving information from the wired network for transmission to a mobile communications unit;
   means for storing the received information for subsequent transmission to the mobile communication unit; and
   means, responsive to a first message that is periodically received from the wired network, for initiating wireless communications with at lest one mobile communication unit that is located within the associated wireless communications coverage area, said initiating means including means for transmitting the stored information to the mobile communication unit; wherein said header station further includes means, responsive to a termination of wireless communications by the header station, for transmitting the first message to the wired network for reception by a second header station for enabling only the second header station to initiate wireless communications.

24. A data communications system, comprising:
   a wired communication network;
   a wireless communications network comprised of a plurality of header stations, each of said header stations having a wireless communications coverage area associated therewith, each of said header stations including,
   means for performing bidirectional wireless communications with one or more mobile communication units that are located within the associated wireless communications coverage area;
   means for performing bidirectional communication with the wired network, including means for receiving information from the wired network for transmission to a mobile communications unit;
   means for storing the received information for subsequent transmission to the mobile communication unit;
   means, responsive to a first message that is periodically received from the wired network, for initiating wireless communications with at lest one mobile communication unit that is located within the associated wireless communications coverage area, said initiating means including means for transmitting the stored information to the mobile communication unit; and
   control means that is coupled to the wired network for periodically transmitting the first message thereto, and wherein said header station further includes means, responsive to a termination of wireless communications by the header station, for transmitting a second message to the wired network for reception by said control means, the second message informing said control means that said header station has terminated wireless communications.

* * * * *

UNITED STATES PATENT AND TRADEMARK OFFICE
CERTIFICATE OF CORRECTION

PATENT NO.   : 5,239,673
DATED        : August 24, 1993
INVENTOR(S)  : Natarajan, K.

It is certified that error appears in the above-indentified patent and that said Letters Patent is hereby corrected as shown below:

In Claim 1, Col. 12, line 3, delete "lest" and insert --least--.

In Claim 3, Col. 12, line 34, delete "y" and insert --by--.

In Claim 5, Col. 12, line 45, delete "ad" and insert --and--.

In Claim 8, Col. 13, line 4, delete "electing" and insert --selecting--.

In Claim 8, Col. 13, line 21, delete "firs" and insert --first--.

In Claim 11, Col. 13, line 42, delete "lest" and insert --least--.

UNITED STATES PATENT AND TRADEMARK OFFICE
CERTIFICATE OF CORRECTION

PATENT NO. : 5,239,673
DATED : August 24, 1993
INVENTOR(S) : Natarajan, K.

It is certified that error appears in the above-indentified patent and that said Letters Patent is hereby corrected as shown below:

In Claim 16, Col. 14, line 46, delete "stations" and insert --station--.

In Claim 22, Col. 15, line 66, delete "doe" and insert --do--.

In Claim 23, Col. 16, line 18, after the word "responsive" insert --only--.

Signed and Sealed this

Tenth Day of May, 1994

BRUCE LEHMAN

*Attest:*

*Attesting Officer*  *Commissioner of Patents and Trademarks*